United States Patent
Teow et al.

(10) Patent No.: US 8,464,354 B2
(45) Date of Patent: Jun. 11, 2013

(54) CONTENT CRYPTOGRAPHIC FIREWALL SYSTEM

(75) Inventors: Kha Sin Teow, Toronto (CA); Ernest Dainow, Toronto (CA); Leonid Nikolaev, Mississauga (CA); Daniel Thanos, Mississauga (CA)

(73) Assignee: CryptoMill Inc., St. Michael (BB)

( * ) Notice: Subject to any disclaimer, the term of this patent is extended or adjusted under 35 U.S.C. 154(b) by 241 days.

(21) Appl. No.: 11/914,339

(22) PCT Filed: May 15, 2006
(Under 37 CFR 1.47)

(86) PCT No.: PCT/CA2006/000775
§ 371 (c)(1),
(2), (4) Date: Sep. 4, 2009

(87) PCT Pub. No.: WO2006/119641
PCT Pub. Date: Nov. 16, 2006

(65) Prior Publication Data
US 2010/0058072 A1    Mar. 4, 2010

Related U.S. Application Data

(60) Provisional application No. 60/680,494, filed on May 13, 2005.

(51) Int. Cl.
*H04L 29/06* (2006.01)

(52) U.S. Cl.
USPC ............ 726/27; 726/9; 726/20; 713/172; 713/193

(58) Field of Classification Search
USPC ......... 726/9, 20, 27, 28, 29; 713/172, 176, 713/185, 193; 380/270
See application file for complete search history.

(56) References Cited

U.S. PATENT DOCUMENTS

| 5,915,019 A | * | 6/1999 | Ginter et al. ............ 705/54 |
| 2002/0010827 A1 | | 1/2002 | Cheng |

(Continued)

FOREIGN PATENT DOCUMENTS

| CN | 1384964 | 12/2002 |
| JP | 2001-195309 | 7/2001 |

(Continued)

OTHER PUBLICATIONS

Product Review: Block unauthorized personal computer devices access with DeviceLock, Oct. 27, 2003, http://articles.techrepublic.com.com/5102-1035-5082802.html.
International Patent Application No. PCT/CA2006/000775, International Search Report dated Oct. 23, 2006.

(Continued)

*Primary Examiner* — Justin T Darrow
(74) *Attorney, Agent, or Firm* — Alexander Anishchenko; Borden Ladner Gervais LLP

(57) ABSTRACT

A system and method that regulates the various operations between computing stations and storage or content. Any operation that involves or may lead to the exchange or accessing of content (data) between storage or hosting content container and computing station may be regulated by means of a policy which comprise a set of rules. Rules may be defined according to specific criteria, including the type of storage, the type of content, the attributes of the content, and other attributes associated with the storage device and/or the content. The policy will be dynamically installed/updated upon a computing station for specific User(s) and will regulate the data operations that may take place between the computing stations and storage or content based on evaluation of the policy. Based on the evaluation of the policy, the requested operation is permitted, restricted in some areas, or denied.

8 Claims, 11 Drawing Sheets

U.S. PATENT DOCUMENTS

| | | | |
|---|---|---|---|
| 2002/0147924 A1* | 10/2002 | Flyntz | 713/200 |
| 2003/0154380 A1 | 8/2003 | Richmond et al. | |
| 2004/0103288 A1* | 5/2004 | Ziv et al. | 713/185 |
| 2004/0199515 A1 | 10/2004 | Penny et al. | |
| 2004/0236958 A1* | 11/2004 | Teicher et al. | 713/193 |
| 2005/0005170 A1 | 1/2005 | Camenisch et al. | |
| 2005/0015608 A1 | 1/2005 | Peterson | |
| 2005/0066069 A1 | 3/2005 | Kaji | |
| 2005/0182925 A1 | 8/2005 | Tsukamura | |
| 2005/0213763 A1* | 9/2005 | Owen et al. | 380/270 |

FOREIGN PATENT DOCUMENTS

| | | |
|---|---|---|
| JP | 2002-132457 | 5/2002 |
| JP | 2003114830 | 4/2003 |
| JP | 2004192601 | 7/2004 |
| JP | 2005-56418 | 3/2005 |
| JP | 2005-56429 | 3/2005 |
| JP | 200592745 | 4/2005 |
| JP | 2005122474 | 5/2005 |
| JP | 2007-535718 | 12/2007 |
| WO | 0025214 | 5/2000 |
| WO | 0042491 | 7/2000 |
| WO | 2005008385 | 1/2005 |
| WO | 2005/054973 | 6/2005 |

OTHER PUBLICATIONS

Kaplan, "IBM Cryptolopes, SuperDistribution and Digital Rights Management", Internet Citation, Dec. 30, 1996, XP002132994, retrieved from the internet http://www.research.ibm.com/people/k/kaplan/cryptolope-docs/crypap/html on Mar. 14, 2000.

Gartner, iPods, other small storage devices pose security risk, Jul. 6, 2004, www.computerworld.com/printthis/2004/0,4814,94319,000.html.

"Step-by-Step Guide: How to use Group Policy Management Console", Microsoft Co., Jan. 7, 2005, http://technet.microsoft.com/ja-jp/library/cc967042.aspx.

English Translation of Japanese Patent Application No. 2008-510378 Office Action mailed Jun. 7, 2011.

European Patent Application No. 06741490.4 Search Report dated Feb. 29, 2012.

English Translation of Japanese Patent Application No. 2008-510377 Office Action mailed Jun. 7, 2011.

European Patent Application No. 06741490.4, Office Action dated Nov. 30, 2012.

European Patent Application No. 06741486.2, Search Report dated Sep. 2, 2011.

English Translation of Chinese Patent Application No. 200680025366.8, Office Action dated Jun. 5, 2009.

* cited by examiner

CONTENT CRYPTOGRAPHIC FIREWALL SYSTEM

FIELD OF THE INVENTION

The present invention relates generally to the field of data communication, and more specifically to a method of regulating data communication between storage and computing stations in a cryptographically secure manner and under the regulation of a generalized policy. Background of the invention Conventionally, within an organization, data that was associated with a user would be stored upon the hard disk associated with a user's computer, or the hard disk associated with a server. If an individual wished to access the data stored on the disk drive, they would be required to first log on to the computer. Once logged on and once access has been granted to the appropriate disk drive, the user would be able to access the content.

In the current computing environment, the amount of data that is transferred and exchanged between organizations and between users within organizations is ever increasing. As a result, conventional disk drives are being augmented with new methodologies to store data. The need for portability of data has brought upon the development of mobile storage devices. Examples of these mobile storage devices include USB storage devices, external hard drives, CDs, and DVDs. These mobile storage devices facilitate information flow between various users and computing stations.

There are inherent risks associated with the use of storage. Storage as used in this document, refers to a physical or logical entity with data contents that can be electronically accessed. Content as used in this document, refers to a logical entity with an application specific logical data structure that contains data (e.g. an electronic application file like a word processing file, spreadsheet file, or database file, etc.) and associated metadata to describe the structure that can be electronically accessed, stored, or transmitted. Policy as used in this document, refers to a set of rules that control the access to, and communication of data between, a computing station and storage. Within an organization, content which is proprietary to an organization must be protected from being accessed by individuals/entities who are not permitted to do so.

In order to attempt to combat the potential threat of misappropriation of contents or data, some organizations have prohibited the use of certain types of storage devices. While this does combat some security risks, operational efficiency and productivity is hindered, as mobile storage devices are very efficient tools for enhancing the ease of data transfer and storage. Some organizations, while realizing that an outright prohibition on using mobile storage devices may not prove to be effective or efficient; have put in place policies that allow for limited use of mobile storage devices in accordance with their own security protocols. These policies, however, lack an effective control mechanism which automatically enforces them. Therefore, it is often left up to an end user to comply with one or more policies that relate to data transfer involving mobile storage means. Policies which do not have an automated enforcement mechanism, will not be able to counter the following types of threats that are posed through the use of mobile storage devices; 1) when mobile storage devices containing confidential information are stolen or lost, 2) the copying of confidential data from a mobile storage device to an unauthorized computing device; and 3) the copying of confidential data from a computing device to a mobile storage device.

SUMMARY OF THE INVENTION

A system and method that regulates the various operations between computing stations and storage or content. Computing stations may be personal desktop computers, work station computers, server computers, laptop computers, or mobile hand-held computers. Storage is a physical or logical entity with contents or data that can be electronically accessed. Physical storage may be internal to the computing stations, or may be external, such that it is connected to the computing station via an external interface. Examples of physical storage include USB Flash Drives, CDs, DVDs, ZIP disks, Hard Drives, Network Drives, Floppy disks, PCMCIA drives. Examples of logical storage are files. Content is a logical entity with an application specific logical data structure that contains data and associated metadata. Examples of content include XML files, HTML files, image files, word processing files, spreadsheet files, database files and subsets of content/data there in.

Any operation that involves or may lead to the exchange or accessing of content (data) between storage and a computing station may be regulated. Operations may include, but are not limited to, reading content, writing content, copying content, deleting content, executing a file, mounting storage such that it is accessible to a computing station, and allowing content to be transmitted across a specific interface.

An administrator and a client application are made use of to regulate the operations that may take place between computing stations and storage. The administrator application is installed upon a trusted computing station, such as a server, such that access is restricted to trusted users. The client application will be installed on a computing station, such as a laptop, so that the interaction of the computing station with the storage may be regulated.

The client applications will be customized for each computing station based on the operations that will be allowed between a computing station and storage. The client applications are customized by means of various policies being defined. The policies that are defined will provide a set of rules, which will govern and regulate the operations that may take place between computing stations and storage. Policies will be determined by the administrator or other trusted individual/entity that is making use of the administrator application.

Policies may be defined according to various rules. More specifically, rules may be specified according to the storage type, the interface, the content type, the metadata information, the operations, and various authentication identifiers.

The storage may be any component that is capable of having data stored upon it. The storage may be internally connected to the computing station, or may be external, such that it is connected by an interface. Storage may not necessarily be one physical device, but may be comprised of one or more storage devices.

The interface is the component that provides the connectivity between the computing station and the storage. Examples of such interfaces may include data buses such as, PCI, USB, SCSI and network interfaces such as Ethernet and Fibre Channel.

The content type is the format of the content (data) that is contained by the storage. As there may be different types of content, it may be possible to define rules that are associated with specific content types, such as for example, rules based on whether the content is associated with an image application or a document processing application.

The metadata information is information about the content. For example, metadata information may be attributes associated with the content, including the date the file was created, the file name, the owner of the file and any access permissions which may be associated with the file.

Authentication identifiers may include identifiers that are associated with a user, entity or the content itself. For example, a user identifier would allow for rules to be defined that would regulate the data operations between a computing station and storage for a particular user. Authentication identifiers may also include security domains and security sub domains, which allow for domains to be defined to which computing stations and storage may be assigned, such that rules may regulate the operations that may take place between computing stations and storage depending on the security domains and security sub domains to which they are assigned.

The client application will enforce the rules that have been defined and that are associated with a particular computing station. The client application will monitor all interfaces that are connected to a computing station and will determine which requests that are being made by and to storage should be allowed based on the rules that have been defined.

The administrator application is also to be used for provisioning storage. Provisioning storage refers to the process by which storage will have encrypted information written to it, such that when an attempt is made to interface to storage that has been provisioned, the client application of the computing station is able to determine which, if any, operations are allowed between the storage and the computing station based on rules the rules that have been defined.

BRIEF DESCRIPTION OF THE DRAWINGS

For a better understanding of embodiments of the systems and methods described herein, and to show more clearly how they may be carried into effect, reference will be made by way of example, to the accompanying drawings in which.

DETAILED DESCRIPTION OF THE INVENTION

Figure 1:
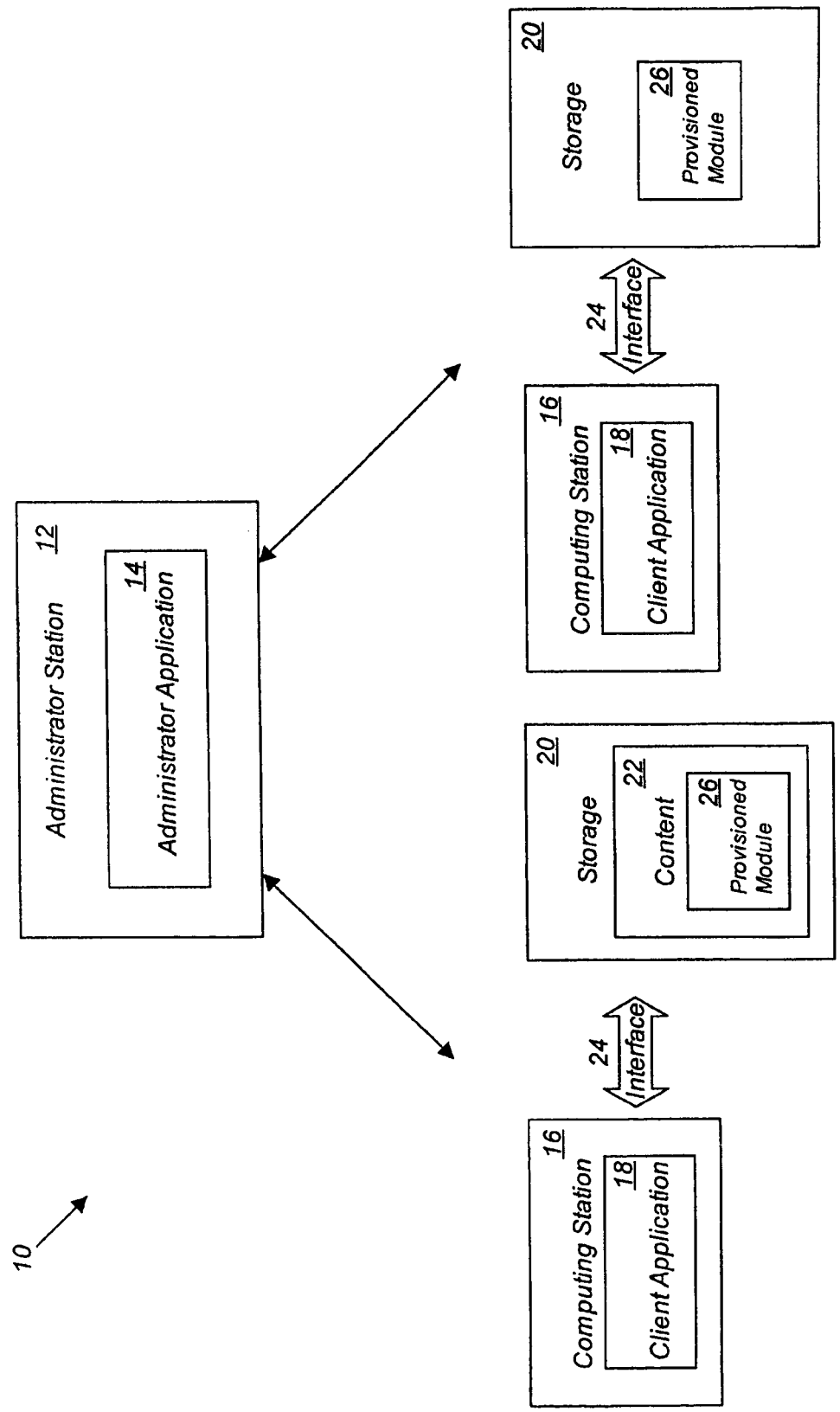
FIG. 1 is a block diagram illustrating the components associated with the Content Cryptographic Firewall system.

Reference is made to FIG. 1, where a Content Cryptographic Firewall System (CCFS) 10 of the present invention is shown. The CCFS 10 is comprised of one or more administrator stations 12, which have installed upon them, or accessible to them, an administrator application 14 and computing stations 16, which will have installed upon them client applications 18. The administrator stations 12 may be connected to computing stations 16 via a network. The administrator station 12 and computing stations 16, may be connected to storage 20. The storage 20 contains content 22, and will be connected to the administrator station 12 and/or computing station 16, by means of an interface 24.

The administrator station 12, is a computer such as a server type computer, wherein access is restricted to trusted individuals within a network, such as network administrators. The administrator station 12 has installed upon it an administrator application 14, which is explained in greater detail below.

The computing stations 16 may be any type of computing device, such as personal desktop computers, work station computers, server computers, laptop computers or mobile/handheld computers. The computing stations 16 have installed upon them a client application 18, which is described in further detail below.

Administrator stations 12, and computing stations 16, may have associated with them storage 20. Storage 20 may contain content 22. Examples of storage 20 include, but are not limited to: magnetic hard disks, flash disks, floppy disks, CD, DVD, ZIP™ disks, iPods™, external FireWire Drives, external USB drives, PCMCIA Flash Drives, network drives and files. Storage 20 may be internal or external to the computing station 16. Content 22 that is stored upon storage 20, may take different formats. Content 22 associated with a specific file that is stored upon storage 20, has a file name that indicates the format of the file. For example, content may be associated with an image, a text document, a multimedia file, etc.

Content or data, will have associated metadata. Metadata is information that describes the content 22. The metadata may include information such as the file name, date of creation of the file, the creator of the file, and any information pertaining to any access restrictions which may be placed on the file. The existence of metadata is dependent on the particular application or operation that has been used to create the file. It should be noted that some software applications may not have metadata associated with the files they create.

The storage 20, may be connected to the administrator stations 12 or computing stations 14 by means of an interface 24. The interface 24 may include, but is not limited to: PCI, USB, Firewire (IEEE 1394), ATA (IDE), SATA, SCSI, Ethernet, or Fibre Channel.

Figure 2:
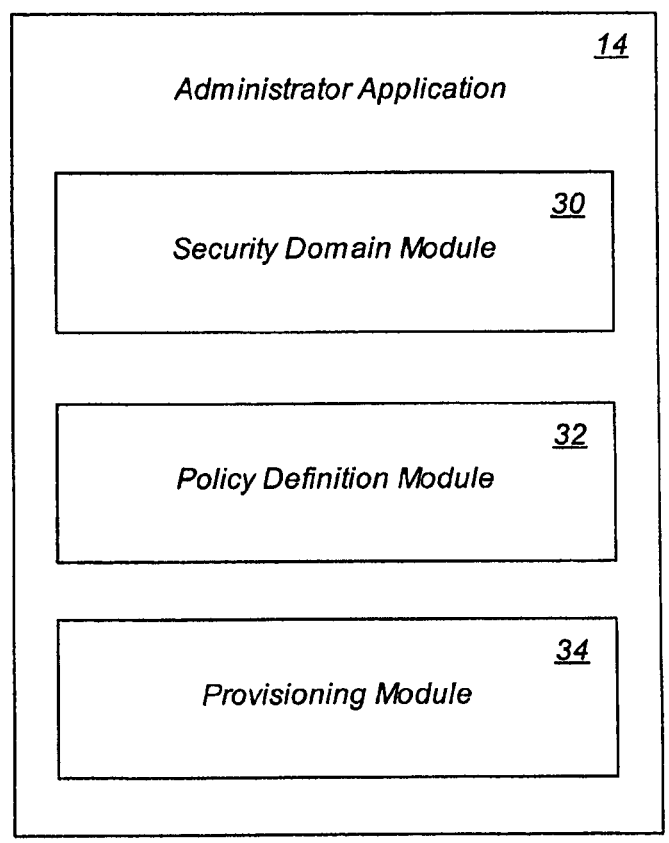
FIG. 2 is a block diagram illustrating the components of an administrator application.
Figure 3:
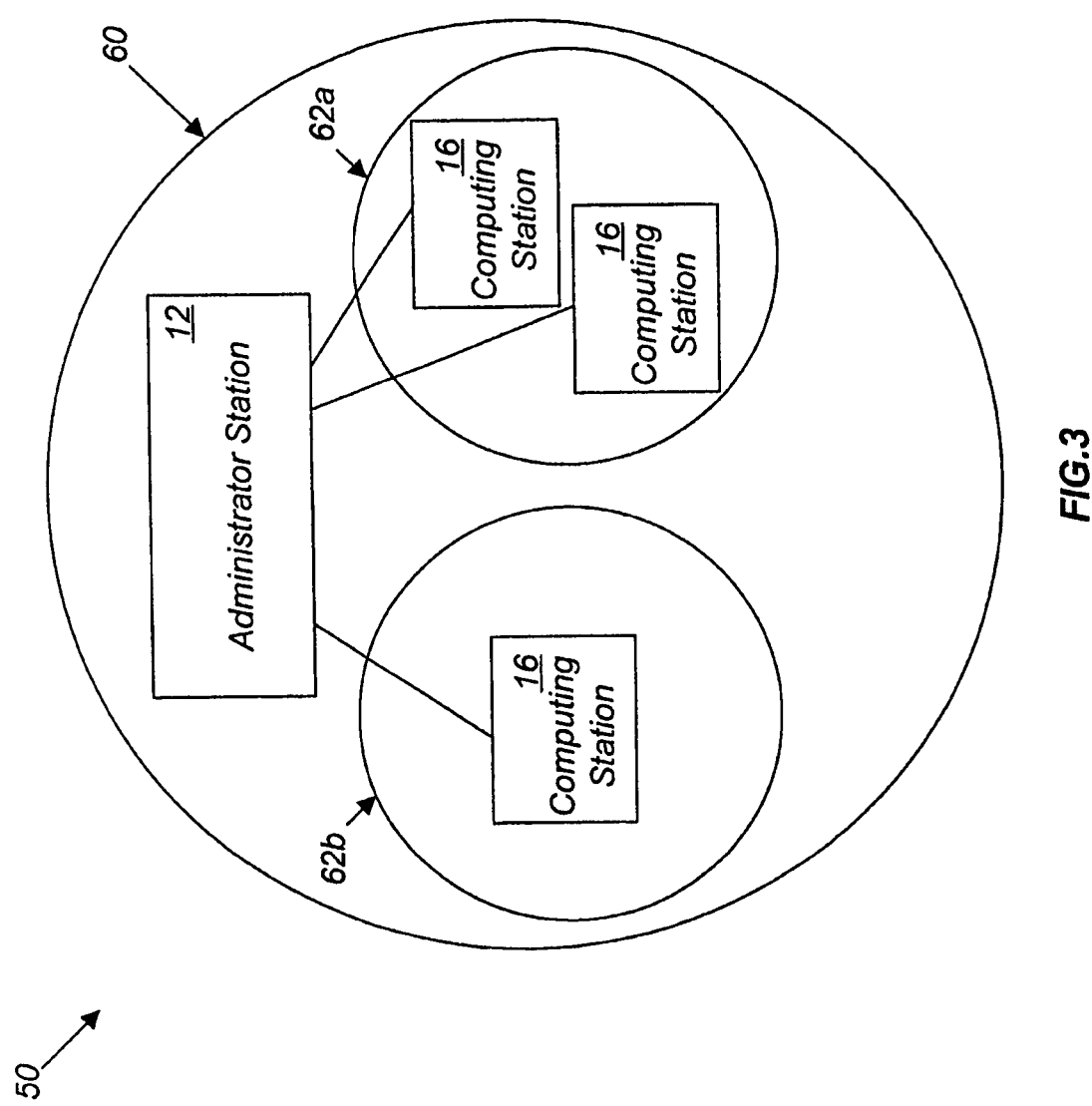
FIG. 3 is a diagram of one security domain and multiple security sub domains.

Reference is made to FIG. 2, where the components of the administrator application 14 are shown in an exemplary embodiment. The administrator application 14 contains a security domain module 30, a policy definition module 32, and a provisioning module 34. The security domain module 30 allows for various domains to be defined, wherein administrator stations 12, computing stations 16, storage 20 or content 22, and users of a network may be associated with one or more domains. Domains are illustrated in FIG. 3, and are described in further detail below. The policy definition module 32, allows the administrator or other trusted individual/entity to define a policy which governs the interaction between a computing station 16 and a storage 20 or content 22. The policies that are defined, determine the various types of interaction that may take place between a computing station 16 and a storage 20. The method of defining policies and then enforcing policies is described in detail below. Policies regulate various types of interaction, including, but not limited to the following; mount operations, copy operations, delete operations, secure delete operations, read operations, write operations, transmit operations, and execute operations. Mount operations make the storage 20 or content 22, accessible to the computing station 16. The copy operation involves copying a certain block of content (data), usually a file, from the storage 20. The delete operation is the process by which content or data is removed from the storage 20 or content 22. The deletion of content or data generally involves the designation of the particular block of storage upon which the content that is to be deleted is being stored, as unallocated storage, so that the particular block of storage may subsequently be written over. The secure delete operation is to be contrasted with the delete operation, where the secure delete operation performs an overwrite of the block of the storage 20. The read operation involves the retrieval of content from the storage 20. The write operation involves the recording of content or data onto the storage 20. The transmit operation involves sending data from storage 20, or content 22, via a particular interface 24 to a device connected to the interface 24. The execute operation involves reading content that is stored upon the storage device in the form of executable instructions (for example, .exe files).

The policy module 32 is used to specify rules that govern the interaction between computing stations 16 and storage 20 or content 22. Rules are installed on a computing station by means of the client application 18. Policies are defined as a set of rules, which are based on what are referred to as control criteria. Control criteria are used to specify the exact nature of the allowed interactions allowed between computing stations 16 and storage 20 or content 22. Control criteria include the type of storage 20, the type of interface, the type of content, attributes associated with the content (metadata), authentication identifiers and operations which have been discussed above. Authentication identifiers will be used to refer generally to identifiers which may be used to define policies, and include security domains and security sub domains and user names.

The provisioning module 34 is used to install the provisioned module upon the storage 20. The provisioned module 26 and its contents are described in further detail below. When a provisioned module 26 is installed upon a storage 20 or content 22, the storage 20 or content 22 is said to be provisioned. Storage 20 or content 22, which have not had provisioned modules 26 installed upon them, will be referred to as nonprovisioned. The provisioned module 26 comprises encrypted data, and will cause any data that is written to the storage 20 or content 22 to be encrypted. The provisioned module 26, will allow the computing station 16 to determine which, if any, operations between the computing station 16 and storage 20 or content 22 may be performed.

Reference is made to FIG. 3 where security domains are illustrated in further detail. FIG. 3 illustrates an organizational network 50 that refers generally to a group of computer stations 16 that are associated with an organization. Some of the computer stations 16 and administrator stations 12 that are members of a security domain may be connected via a computer network, but it is not necessary for a computer station 16 or an administrator station 12 to be part of the computer network to be part of the security domain. In FIG. 3, it is shown that all the computing stations within the organization 50 belong to one security domain 60. The system 10 will require the creation of at least one security domain 60. The system 10 may have one or more security sub domains. In FIG. 3, it is shown that there are two security sub domains, notably, security sub domain 62a and security sub domain 62b. Security sub domains are generally organized so as to include all the computing devices that may be associated within a department or where some other logical relationship may exist between the computing devices. Computing devices are associated with a security domain and the optional security sub domain by means of the client application 18 that is installed upon all the computing devices 16. The client application 18 as is explained in further detail below is installed upon a computing device 16 such that it is cryptographically protected by means of encryption and digital signatures. The client application 18 may not be tampered with without being detected, and as a result, the security domains and security sub domains that are associated with the computing station 16 may not be altered unless specified by the administrator.

Figure 4:
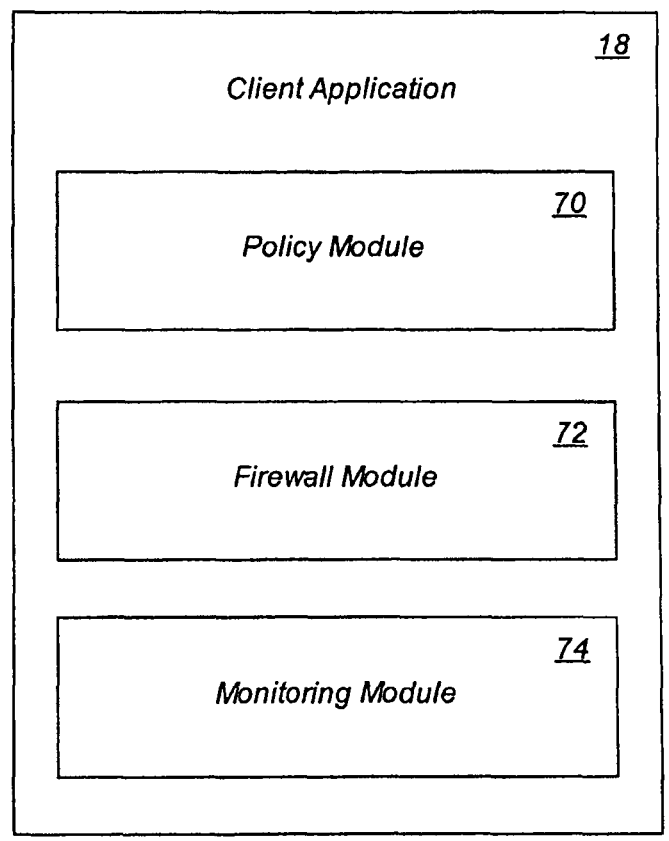
FIG. 4 is a block diagram illustrating the components of a client application.

Reference is made to FIG. 4, where the constituent components of the client application 18 are shown in an exemplary embodiment. The client application 18 is installed on all computing stations 16 that are to be part of the CCFS 10. The client application will be a software application that is customized for computing station 16 through the creation of a policy. The client application will serve to assign the respective computing device it is installed upon, with a security domain and optional security sub domain. The client application 18 in one embodiment comprises a policy module 70, a firewall module 72, and a monitoring module 74. The policy module 70 is comprised of the rules that have been specified with respect to a particular computing station 16. The method of specifying the rules is described in detail below. The firewall module 72, controls the operations which may take place between a computing station 16 and storage 20 or content 22. The firewall module 72 enforces the rules that have been defined and included in the policy module 70. The rules either permit or deny requests that are made by certain storage 20 or content 22 or to certain storage 20 or content 22 for a particular operations to be performed. The firewall module 72 receives information from the monitoring module 74, which detects attempts by storage 20 or content 22 to interface with a computing station. The monitoring module 74 determines the nature of the request (i.e. what type of operation is being requested, a read operation, a write operation, and other operations as described above) that is being made between the computing device 16 and the storage 20 or content 22. The client application 18, when installed upon the computing station 16 is cryptographically protected, as is explained in further detail below, such that the contents (particularly the policy module 70 which contains the rules) of the application may not be altered. Each of the constituent components of the client application 18, once installed upon the respective computing station 16 may be replaced or altered by the administrator without effecting the other components of the client application 18.

Figure 5:
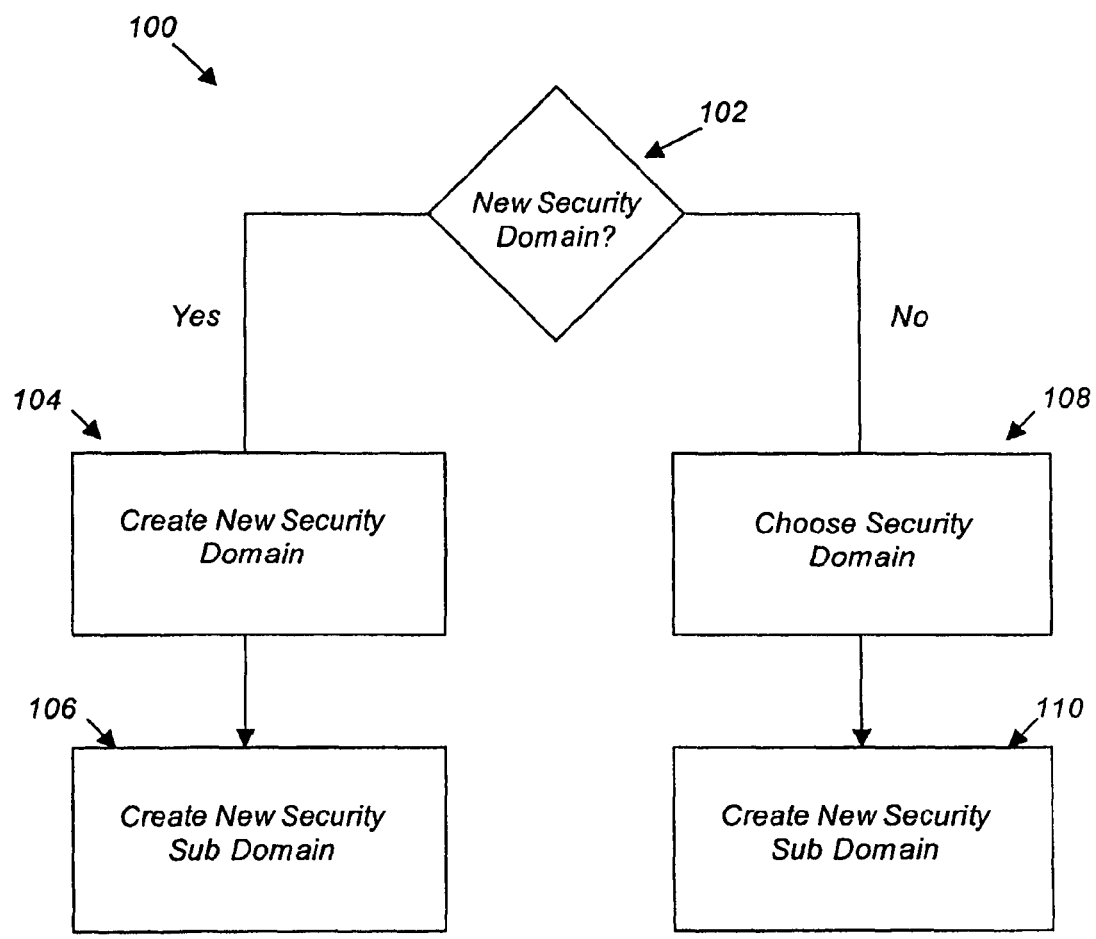
FIG. 5 is a flowchart illustrating the steps of a security domain creation method.

Reference is now made to FIG. 5, where the steps of the security domain creation method 100 are shown. The domain creation method 100 is part of the administrator application 14, and more specifically the security domain module 30. As stated above, the administrator is required to create at least one security domain for the system 10. The creation of the security domains and subsequent management of security domains and security sub domains is undertaken by the administrator application 14.

Security domain creation method 100 begins at step 102, where an administrator will be given the option of creating a new security domain or creating a new security sub domain (provided a security domain exists). If the user chooses to create a new security domain, method 100 proceeds to step 104. In step 104, the name of the security domain is specified by the user and the security domain module generates a security domain secret. The security domain secret is a globally unique identifier that is used for cryptographic. purposes. It is independent of the name of the security domain specified by the user and will never be regenerated by the administrator application 14.

Upon the user specifying a new security domain method 100 proceeds to step 106. In step 106, the option is provided of specifying a new security sub domain that will be associated with the security domain specified in step 104. Step 106, is an optional step. In step 106, one or more security sub domains may be defined for a security domain. For each security sub domain defined by the user, the security domain module generates a security sub domain secret that is a globally unique identifier and different from any other security domain secret or security sub domain secret generated.

Upon the user specifying the security domain in step 104, and optionally the security sub domains that are to be created in step 106, the security domain names and secrets and security sub domain names and secrets are stored encrypted upon the administrator station 12.

If in step 102, the user selected the option to define a security sub domain for an existing security domain, then method 100 proceeds to step 108. In step 108, the user will specify the security domain for which a new security sub domain is to be defined. The user, in step 108, will be presented with the security domains that have already been created, and will chose one of the security domains.

Method 100, upon the user selecting the security domain in step 108, proceeds to step 110. In step 110, the user specifies the new security sub domain they wish to create. Upon the user creating the new security sub domain, the security sub domain name and secret that has been created is securely stored upon the administrator station 12.

Method 100 may be invoked by the administrator at any time, and therefore security domains and security sub domains may be created at any time. Policies are specified by the administrator or other trusted user, who has access to the administrator application 14. Within system 10, one or more policies may be defined. A policy refers to a set of rules that governs the interaction between a computing station 16 that has been associated with the respective policy and storage 20 or content 22. The policy is installed upon the computing station 16 as part of the client application 18, and more specifically as part of the policy module 70.

The administrator application 14 contains a policy definition module 32 that allows the administrator or other trusted individual to define a set of rules. The set of rules govern the interaction between computing devices 16 and storage 20 or content 22.

Figure 6:
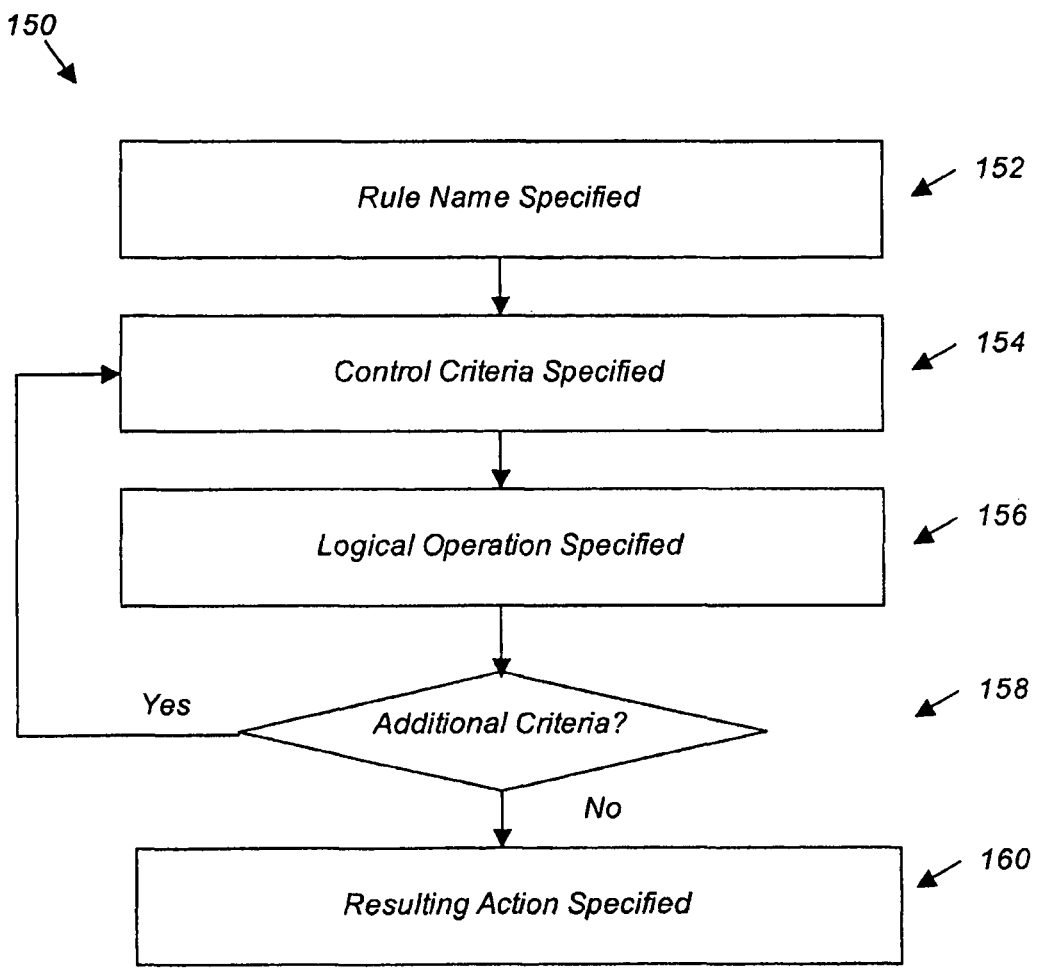
FIG. 6 is a flowchart illustrating the steps of a rule specification method.

Reference is made to FIG. 6, where the steps of a rule specification method 150 are shown in an exemplary embodiment. Rule specification method 150, is undertaken by the administrator or other trusted individual upon the administrator station. Rule specification method 150 results in policies being defined, wherein the policies consist of a set of rules. This policy may be then be included in the client application 18, and more specifically as part of the policy module 70. Policy and rule specification methods may also be used to edit policies and rules that have previously been created.

The rule specification method 150, begins at step 152, wherein the name of the rule that is to be created, will be specified by the administrator Method 150, then proceeds to step 154, wherein control criteria are specified. Control criteria may include but are not limited to, the type of storage, the type of content, the interface, and information relating to metadata, authentication Identifiers, operators (such as and, or, not, and other logical identifiers), as described earlier.

Method 150 then proceeds to step 156, wherein a logical operator is selected. This may be, but not limited to: and, or, not, nor, exclusive or, is (equal), is not, less than, greater than, is a member of, is not a member of. The control criteria specified in step 154 and the logical operator specified in step 156 combine to create a logical expression that can be evaluated to be either true or false according to the standard rules of Boolean algebra. An example of a logical expression is "Storage is Provisioned", where Storage is a Control Criteria, Provisioned is a possible attribute of Storage and the logical operator is "is". This expression is evaluated to either true or false.

Method 150, then proceeds to step 158, where if additional control criteria are to be specified, then method 150 returns to step 154. If no additional criteria are to be selected, then method 150 proceeds to step 160. At step 160, the administrator specifies an action that will be taken if all the logical operations specified in the rule are true. The possible actions may include but are not limited to, permit, permit read-only, deny, encrypt, notify. The action permit, allows all access to the storage 20 or content 22 that was identified by the control criteria specified in the rule. The action permit read-only, allows read operations but blocks other operations such as write. The action deny, blocks all operations. The action encrypt, specifies that data written is encrypted and data read is decrypted. The action notify, specifies that an information message will be sent if the control criteria specified are true. The notify action may be qualified with the text for the message and the recipients for the message. Possible recipients may be a log file, an email address or a telephone number.

Upon the conclusion of step 160, a rule will have been defined. An example of a rule that blocks access to USB storage if the storage is not provisioned is "If (Storage Is USB) And (Provisioned Is False) Then Deny". An example of a rule to allow a word processing document file to be read from either provisioned or unprovisioned storage if the metadata category has been marked general is "If (Operation Is Read) And (ContentType Is WordDoc) And (MetadataCategory Is "General") Then Permit". An example of a rule to block a program from running if it is not on an authorized list of applications is "If (Operation Is Execute) And (ContentType Is Not a Member of ApplicationList) Then Deny".

A policy may be created by specifying the list of defined rules that are to make up that policy. The policy may then be installed upon a computing station 16 that is to be part of the system 10 with the client application 18. The client application as it contains the policy module 70 is then used to enforce the appropriate policy for that particular computing station 16 or for a particular user who logs onto that computing station. As the administrator application 14, and in particular, the policy definition module 32, are used to define a policy, the policy that has been defined may be included in the policy module 70 of the client application 18, as the client application 18 is customized upon the administrator station 12. The client application 18 along with the respective policy may be installed by a network installation or other conventional means. The client application 18, and in particular the policy module 70, when installed upon a computing station 20, provides the cryptographic means, whether asymmetric or symmetric, to detect any unauthorized tampering or alteration to the policy.

Storage 20 or content 22, as described above, may be either provisioned or unprovisioned. Provisioned storage 20 or content 22, will have a provisioned module 26 written to them. The provisioned module 26, which is described in FIG. 8, allows for the client application 18 to be able to determine whether the particular provisioned storage 20 or content 22 is to be communicated with, and if so, what operations are allowed between the provisioned storage 20 or content 22 and the computing station 16.

Figure 7:
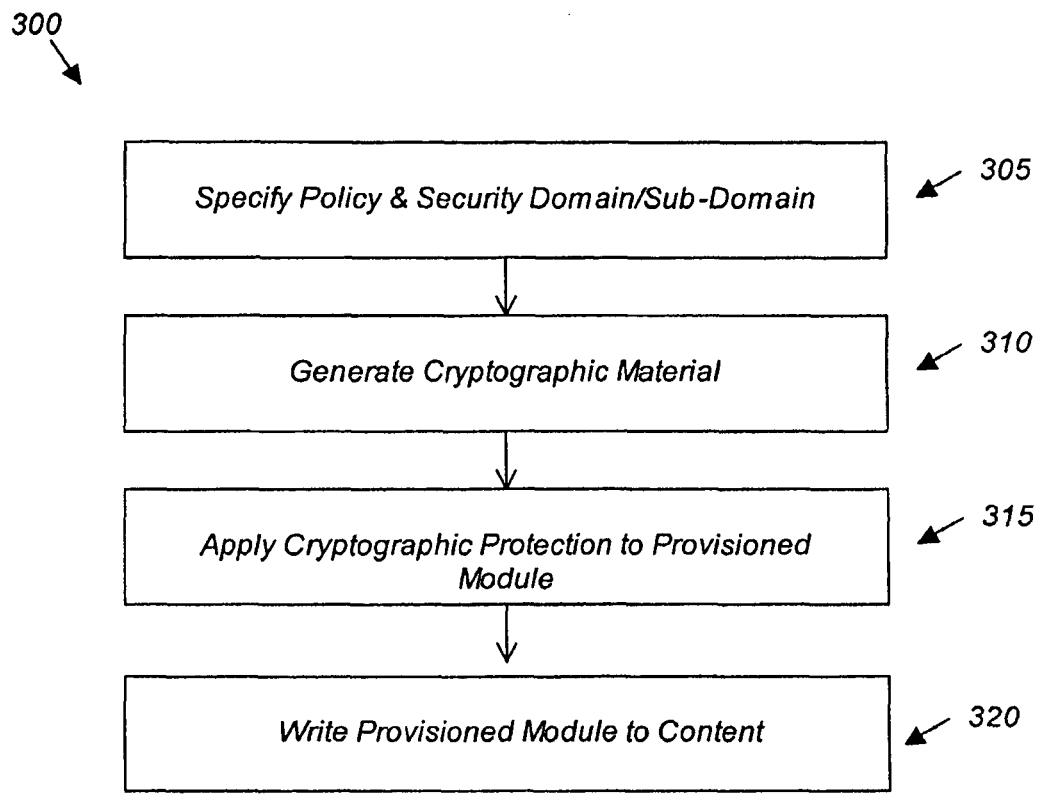
FIG. 7 is a flowchart illustrating the steps of a provisioning method.

Reference is now made to FIG. 7 where the steps of a provisioning method 300 are shown in one exemplary embodiment. Provisioning method 300 is further described by making reference to FIG. 8, which details the contents of the provisioned module 26. Provisioning method 300 is the process by which policy information is installed upon the storage 20 or content 22, through the provisioned module 26. Provisioning method 300 begins at step 305, where the Administrator specifies a policy that has been created in method 150, security domain and optional security sub domain for storage 20 or content 22.

Figure 8:
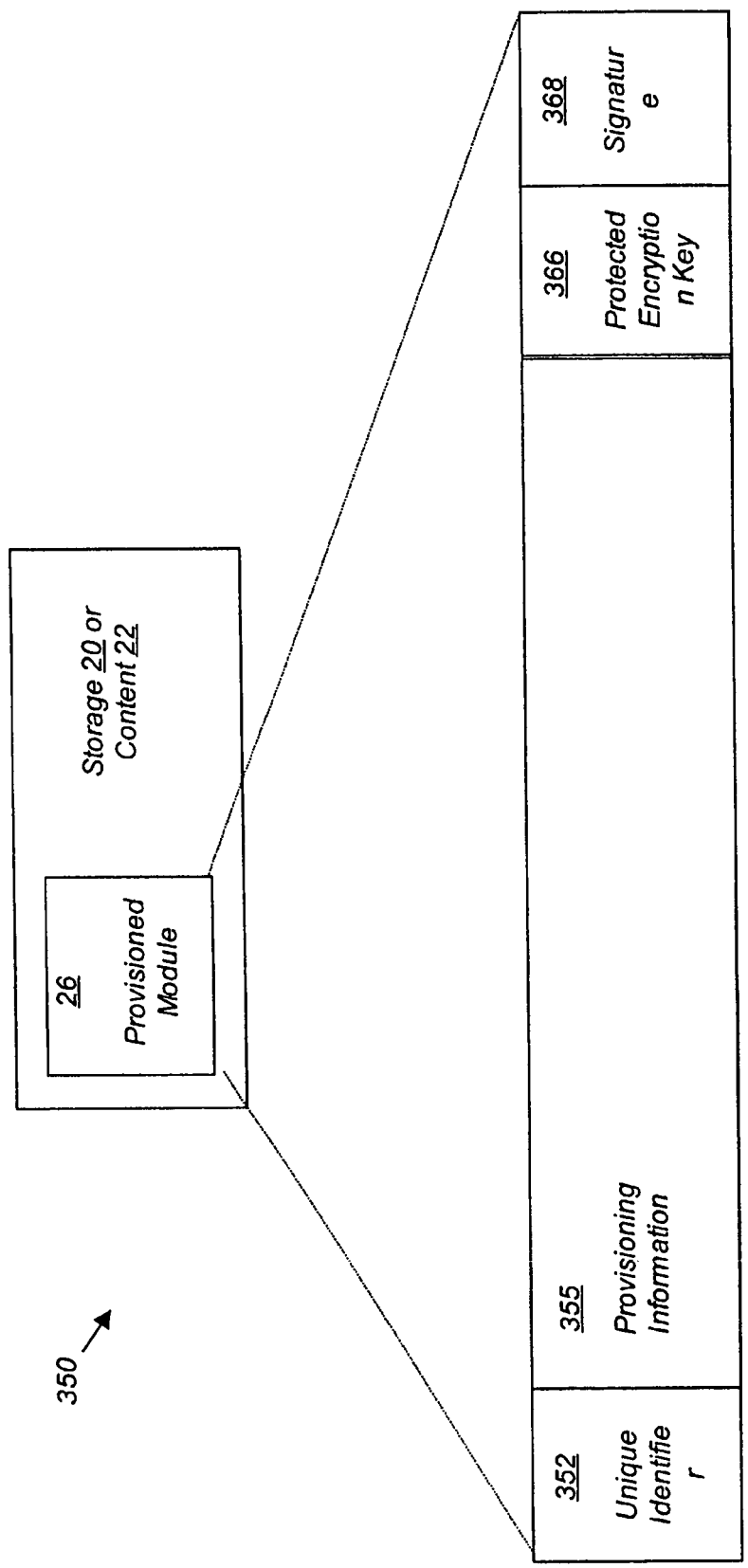
FIG. 8 is a block diagram illustrating the provisioned module.

Method 300 then proceeds to step 310. In step 310, the cryptographic material, such as the encryption key 366 that is shown in FIG. 8, is generated, and will subsequently be used to protect the storage 20 or content 22.

Method 300 then proceeds to step 315, where cryptographic protection is applied to the provisioned module 26. Cryptographic protection includes encrypting the encryption key 366 and calculating a signature 368 that is to be associated with the provisioned module 26.

Method 300 then proceeds to step 320, where the provisioned module 26 is written to storage 20 or content 22.

Reference is made again to FIG. 8, where the storage 20 or content 22 is shown having the provisioned module 26 installed upon it. The provisioned module 26 allows the client application 18 to control access and enforce policy upon the storage 20 or content 22. The information that is contained in the provisioned module 26 is based on the selections made in the provisioning method 300.

In one embodiment, the provisioned module 26 includes a unique identifier 352, which is used in order to identify the provisioned module 26. The provisioned module 26, includes, provisioning information 355, which provides identification information such as security domains, security sub domains, user supplied identifiers, expiry information, and additional cryptographic materials that are used to protect the encryption key 366 and the provision module 26 itself. In an alternative embodiment of the provisioning method 300, an expiry date for the provisioned module 26 may be specified. The expiry date, is a date after which the contents of the storage 20 or content 22 will not be readable to any computing station 16, and such a date may be part of the provisioning information 355. An encryption key 366 is used to encrypt the data written to storage 20 or content 22 and a signature 368 is used to verify the integrity of the provisioned module 26. In one embodiment, the encryption key 366 when first written to the storage 20 or content 22 is encrypted with an encryption key that is generated using a dynamic key generation means like PKCS#5. A default password and the security domain secret are used as input to the key derivation function as described below. The key derivation function dynamically generates the key that is used to encrypt the encryption key 366. When the storage 20 or content 22 that has been provisioned is then used to interface with a computing station 16 that is part of the system 10, the user is requested to enter their own password and change the default password that has been specified, and the password that is entered along with the security domain secret are used to encrypt the encryption key 366 using the same means as specified for the default password. The signature field 368, contains in one embodiment, a HMAC SHA256 signature that is used by the system 10 to determine whether the contents of the provisioned module 26 may have been altered.

As a result of the storage of the encryption key 366 upon the storage 20 or content 22, any data that is written to the storage 20 or content 22 (if the respective policy and its rules allow for such an operation) will be encrypted by the encryption key 366. As a result, if a user attempts to use a computing station 16 that is not part of the system 10 to access a provisioned storage 20 or content 22, the computing station 16 will be unable to access the data as it is encrypted, and the appropriate decryption may not be performed.

Figure 9:
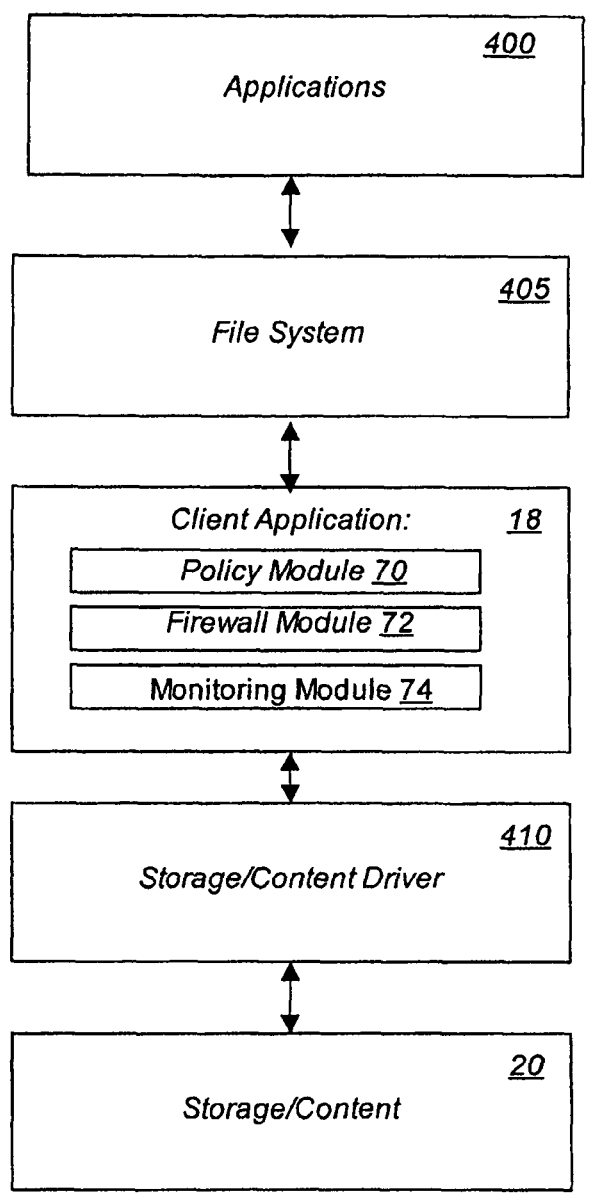
FIG. 9 is a block diagram illustrating the interaction between the client application components and the computing station.

Reference is now made to FIG. 9, where a block diagram illustrating the interaction between the components of the computing station 16 and the storage 20 or content 22 are shown in one exemplary embodiment. Applications 400 may represent any application that is resident upon, or connected to, the computing station 16 that may require data from a storage 20 or content 22. Examples of such applications are provided for purposes of example, and may include word processing applications, web browsers, and database programs. The file system 405 is part of the operating system that is installed upon the computing station 16, and is used to receive and respond to requests for data from applications 400. In conventional systems, the file system 405, would receive the request from the application 400 for data to be retrieved from a specific location and then send that request to a storage/content driver 410. The storage/content driver 410 is an operating system driver that will first receive the data from the storage 20 or content 22. The storage/content driver 410, may be comprised of more than one driver, for example, a volume class driver, a disk class driver, and a port driver may all be part of the storage/content driver 410. In the system 10, the client application 18, and more specifically, the monitoring module 74, will receive all requests between the file system 405 and the storage/content driver 410. The monitoring module 74, will send to the firewall module 72 the nature of the request that is being made, and the firewall module 72, based on the rules that have been specified in the policy module 70 will determine whether such a request is to be allowed. Therefore, the client application 18 will enforce the policy that has been included as part of the policy module and will only then allows those operations which are supported by the policy.

Figure 10:
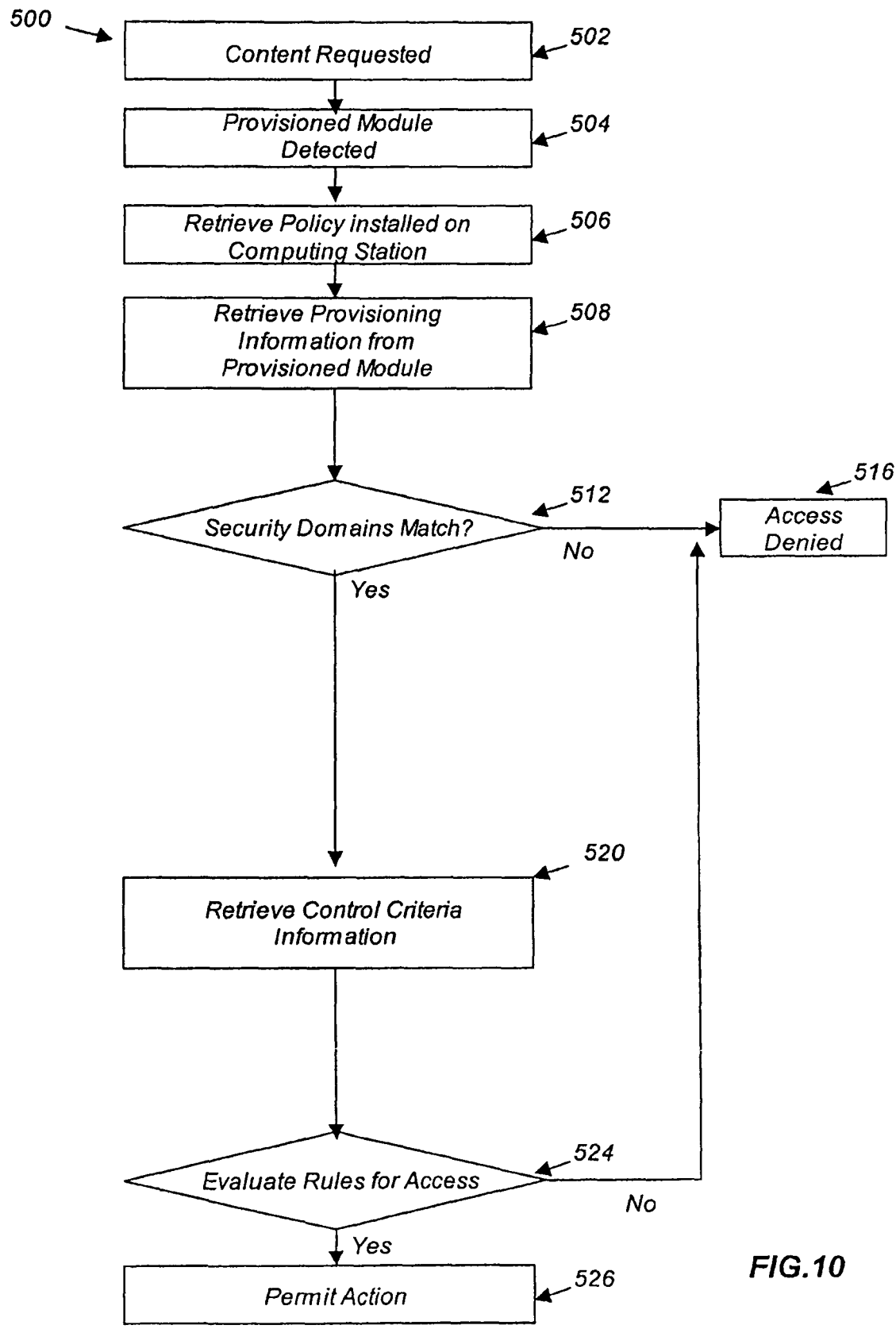
FIG. 10 is a flowchart illustrating the steps of a content access method.

Reference is made to FIG. 10, where the steps of a device access method 500 are shown. Device access method 500 is carried out by the client application 18 and is used to determine whether the computing station 16 may interact with the storage 20 or content 22. Device access method 500 is shown for purposes of example, with respect to an attempt to access a provisioned storage 20 or content 22.

Method 500 at begins at step 502 where the client application 18 receives a request for data. Method 500 may receive a request for data from the file system 405, which is being used as an example with respect to one embodiment.

Method 500 then proceeds to step 504, wherein the storage 20 or content 22, from where the data is being requested, and more specifically the provisioned module 26 is detected by the monitoring module 74 of the client application 18. Method 500 then proceeds to step 506, wherein the policy installed on the computing station 16 is retrieved from the policy module 70.

Method 500 then proceeds to step 508, wherein the provisioning information 355 is retrieved from the Provisioned Module 26. Method 500 then proceeds to step 508, wherein the provisioning information 355 is retrieved from the Provisioned Module 26. Method 500 then proceeds to step 512, where the security domain Information retrieved from step 506 is compared with the security domain information retrieved in step 508. If they match, method 500 will proceed to step 520. If they do not match, method 500 will proceed to step 516. Also, an optional step of checking if the security sub domains (if they have been specified) match, may also be performed in step 512. In step 516, the request for the operation to be performed between the computing station 16 and the storage 20 or content 22, will be denied and the appropriate application 400 that requested the operation to be performed will be informed that the operation may not be performed. This will thus ensure, that in order to be able to access a provisioned storage 20 or content 22, the provisioned storage 20 or content 22 must be associated with the same security domain as the computing station 16. In one embodiment, the policy module 70 contains the security domain secret and the provisioning information 355 contains a hash value (SHA-256) of the security domain secret. The match in step 512 is done by calculating the hash value of the security domain secret in the policy module 70 and comparing it to the hash value in the provisioning information 355.

Method 500 then proceeds to step 520, where control criteria information pertaining to the requested operation is retrieved. Control criteria pertaining to the request will provide metadata and other content related information that may be associated with the data for which access is being requested.

Method 500 then proceeds to step 524, where the rules that make up the policy retrieved in 506 are evaluated using the content identification information in step 520. The details of rule evaluation are described in FIG. 11. If it is determined that the rules do not allow the requested operation to be performed, the request will be denied by method 500 proceeding to step 516. Otherwise, the Method 500 proceeds to step 526, wherein the action is permitted.

Figure 11:
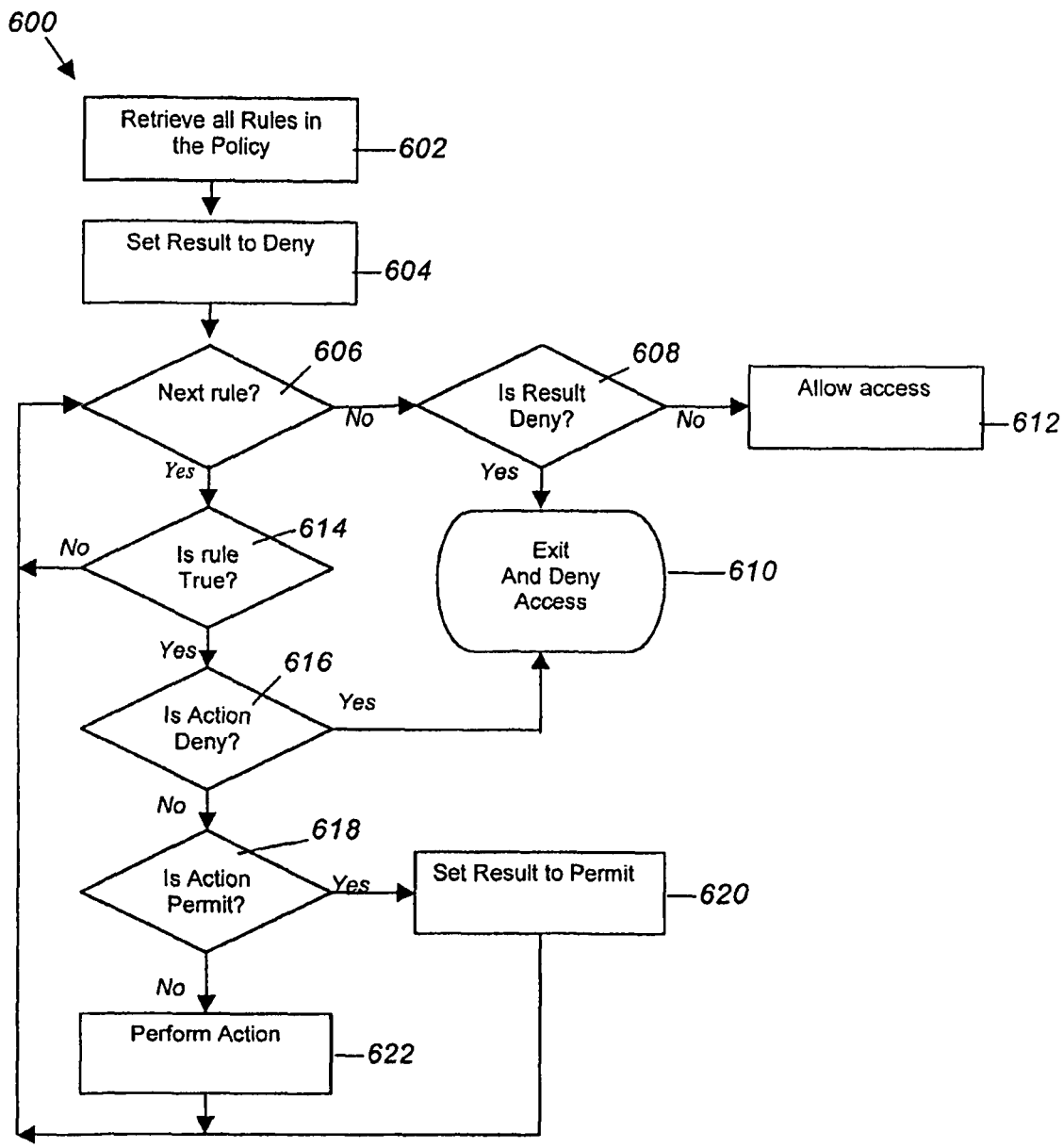
FIG. 11 is a flowchart illustrating the steps of a rule evaluation method.

Reference is made to FIG. 11, where the steps of a rule evaluation method 600 are shown. Method 600 is used to evaluate all the rules that are associated with a particular policy Method 600 begins at step 602, where the policy is retrieved from the client application 18, and more specifically the policy module 70. Method 600 then proceeds to step 604, wherein as a default, the result of the rule evaluation method is set to deny the requested action.

Method 600 then proceeds to step 606, wherein a check is performed to determine whether another rule remains to be evaluated from the policy. If in step 606, it is determined that no rules remain to be evaluated, method 600 proceeds to step 608. In step 608, a check is performed to determine whether the result of the rule evaluation method is set to deny. If the result is set to deny, then method 600 proceeds to step 610, where method 600 terminates, and the requested operation is denied. If in step 608, the check reveals that the result is not set to deny, as it is permitted, then method 600 proceeds to step 612, wherein the requested operation is permitted.

If in step 606, it is determined that rules remain to be evaluated, method 600 proceeds to step 614, where the rule is evaluated. If the rule evaluates to true, method 600 proceeds to step 616, wherein it is determined whether the action that is associated with the rule is set to deny the requested operation. If the action is set to deny the requested operation, then method 600 proceeds to step 610, where the requested operation is denied, and method 600 is terminated.

If in step 616 it is determined that the action is not to deny the request, then method 600 proceeds to step 618, where a check is performed to determine if the action is permit. If the action is permit, then method 600 proceeds to step 620, where the result is set to permit. If in step 618, the result of the check is that the action is not set to permit (and it has previously been determined that it is not set to deny) then method 600 proceeds to step 622, where the action is performed. In step 622, the action is performed, because the action may be other than to permit or deny an operation, as it may relate to a notification that is requested.

Regardless of the outcome of the check performed in step 618, upon the conclusion of both steps 620 and 622, method 600 proceeds back to step 606 to determine whether other rules remain for evaluation.

The keys that are used in the encryption of data as has been described, are derived using a key derivation hierarchy, employed in a key management system. A key that will be referred to as the root key will be associated with the system 10. The root key, which may be a symmetric or asymmetric key, is used by the system 10, to derive keys that will be used in encryption (such as for example, the encryption key 366 that is part of the provisioned module 26).

A description of the key management system, is provided in the section below, titled, "Key Management".

Key Management

CCFS uses secure keys to perform authentication, integrity checks, encryption/decryption, and therefore, key management is a very important component that is responsible for CCFS overall security throughout its life cycle.

The CCFS key management protocol supports: 1) strong encryption; 2) adequate throughput; 3) key recovery; 4) one-step electronic date shredding; 5) good keys unpredictability; and 6) policy-driven data access.

CCFS key management (KM) uses a hierarchical key model: with one Master Key (MK) at the top, and a tree of dependant keys underneath. Each key on level N depends on its parent from level N−1 as well as on a seed message generated by N-level security officer and, possibly, other N-level secret-holders (level 0 being the highest, level 1 is next, and so on). A key from level N, in turn, must be used to derive its N+1 level child key. Each key, except MK, has exactly one parent, but can have many child keys associated with it. Association means that applying its parent key on a seed message, ticket (see below) and a special Key Derivation Function (KDF) can derive a child key.

Each key, except MK, has both vertical and horizontal dependencies (see formula below). As a KDF, KMS uses Password Based Key Derivation Function—PBKDF (for example, PBKDF2, described in PKCS#5 v2 standard). PBKDF gives good keys entropy. As a seed for PBKDF, KMS supports either Shamir key-splitting scheme to generate a seed out of M private passwords; any K of them can be used to reproduce the seed (values for M and K (K<=M−1) will be configurable), or a straight password. This will address feature 6. KMS protocol addresses (1) by utilizing symmetric Advanced Encryption Standard—AES (for example, by using AES-256). AES encryption is both very strong and allows significant throughput, which can be achieved even by software only (features 1,2). Keys are stored on a media wrapped with user login and password using PBKDF. This will facilitate key distribution.

To facilitate an easy one-step crypto shredding, every level of keys, except MK, has a shared ticket—half SHA size byte message, that is used together with a seed (unique for each key) to derive keys at that level. By destroying a ticket for some level, all keys are effectively not recoverable from that level (including) downwards.

The ticket for each level is stored in either HSM and is accessible via UserID and password, or stored locally and can be wrapped using, for example, PKCS#5 protocol. Whenever a key at some level N+1 has to be restored, Secret Holders have to supply their secrets, and the associated Ticket has to be obtained as well; There will be a process enabled by a special application that obtain the ticket for the level just once, and then all the keys can be created/restored for that level.

The following provides an example of the key derivation functions that are employed in the key management system.
PrK, PubK be Private and Public Keys of MKP;
P1, P2, ... be passwords from password-holders to generate a seed (shared secret in Shamir's terminology) for MK;
SHAMIR—Shamir's key-splitting procedure;
SHA—Secure Hash function (for example—SHA2 that produces 32 bytes of a fingerprint);
PBKDF—Password Based Key Derivation Function;
AESn—AES key from level N.
Then the key derivation process is as follow:
MK derivation:
PBKDF(PrK(SHA(SHAMIR(P1, P2, ..., PM))))=$AES_0$
And MK fingerprint (MKF) is calculated as:
PubK(SHA(SHAMIR(P1, P2, ... PM)))=MKF.
MKF is public knowledge that is used to verify that MK is restored correctly.
To verify MKF:
1) HSM uses PrK to decrypt MKF to get SHA(SHAMIR (P1, P2, ... ));
2) SHAMIR function is applied to get a seed: SHAMIR (P1, P2, ... )
3) SHA is calculated on a seed;
4) The result of step 3 is compared with 1)
Both formulas must be implemented in HSM with the only inputs being P1, ..., PK.
Key derivation for level N+1 is accomplished through the following formula:

PBKDF(AESn(<first half of SHA(seed|T)>))=$AES_{n+1}$

Where T is Ticket for N level, operation "|" means concatenation of byte streams.

The seed can be either a secret chosen by a Security Officer responsible for the data which is going to be protected under the key $AES_{n+1}$, or a shared secret generated by SHAMIR procedure on inputs from N+1 level Secret Holders. Key Management System will give a choice.

Each root key starts a key hierarchy and, thus, defines a security domain—set of objects protected by keys derived from the root directly or indirectly. Objects from a different domain cannot be decrypted and, therefore, are inaccessible. Domains represent cryptographic boundaries, which are important to have to comply with many security regulations. By applying the same cryptographic mechanism, any number of security subdomains can be created. For example, if some tickets have the same subset of bytes they effectively fall into the same subdomain. By denying knowledge of that shared ticket information, objects became inaccessible. Any application that performs cryptographic operations on keys can, therefore, impose access policies based on both domain and subdomain restrictions. By applying long enough tickets, any desired number of levels can be achieved. To facilitate domain/subdomain restriction, Domain/Subdomain ID can be generated (for example, in the form of big unique integers) at the same time as keys are generated.

Every N-level key, except for MK, has to have a policy file stored locally on a media together with a wrapped key (see Distributing keys section about key wrapping). Key policy file can be encoded as a X.509 v3 certificate or a binary file.

The policy file contains some or all of the following fields: policy creation date; key expiration date; access level (either CCFS admin, or external user); security domain ID in an encrypted form or as it's SHA; security subdomain ID in an encrypted form or as it's SHA; check schedule (time interval to check policy); user login name associated with the key (several users can be associated with the same key, but only one key is associated with a user); volume the key is associated with; admin login name; activated status; key's hash (driver's ID); signature (based on HMAC-SHA, for example).

If a key policy file is encoded as a binary file, the layouts of the unencrypted fields may be as follow. The encoding might use ASN.1 approach: every field has one byte tag, one byte length, and value bytes: {tag, length_byte, value_bytes ... }.

The whole policy is encrypted with a wrapping key using, for example, PKCS#5 protocol. The wrapping key is created using a special wrapping password which is not stored anywhere and is applied every time both the key and the policy file get distributed. Before wrapping, policy file gets re-signed with a wrapping password.

Therefore, wrapping requires both passwords—one that has been used for creating a key, and a wrapping password. This provides the authentication for the wrapping process. However, unwrapping both the key and the policy file, and checking policy's signature required just the wrapping password.

Key recovery is an ability to reconstruct an encryption key without having known a password for a wrapping key. It's a very important feature that allows data to be recovered in a case of a password loss. On the other hand, key recovery cannot be done by an end user, thus providing strong cryptographic protection to data. Only authorized Secret Holders can recover any key, except MK, with a help of a special application:

The key recovery feature is built into the key scheme: having Ticket for the required level and enough Secret Holders to recreate a seed by applying Shamir's threshold scheme and applying key derivation formula, any key, except MK, can be recovered, and a special application for it. This application will first verify Secret Holder credentials by either verifying their Certificates, or Personal profile files.

Any key is destroyed by either key erasing or by zeroizing an HSM holding the key. Also, destroying some secret holdings secrets ensures that Secret Holders cannot recover that key even if they obtain Ticket. The number of destroyed secrets has to exceed the threshold. By destroying a key, encrypted with it data becomes unusable.

Electronic shredding refers to irrecoverable key destruction, so any data that has been encrypted by that key is, effectively, useless and is an "electronic garbage". To electronically shred the whole level, Ticket for that level is destroyed first, and then enough secrets to disable Shamir's threshold scheme have to be destroyed together with a physical key for a specific node. To facilitate massive electronic shredding, a special hierarchy is required (see next section).

There are several suggestions on a key hierarchy that will facilitate key management and electronic shredding. For example, ff some data is going to be archived offsite, it should be encrypted by a key/keys that represent a subtree from a well known node. Then destroying the key for that node will effectively shred the data. Alternatively, if some data within an archived volume has different lifecycle (different life horizon or validity time), data of the same validity time should be encrypted by a separate subtree of key/keys. Each node in key hierarchy should start a new subtree of keys using to encrypt data with not-interleaved validity time. Data that has no expiration date may be encrypted by the first level keys. Generally, the deeper the key hierarchy goes, the more short-lived data is.

Symmetric encryption requires input data length to be divisible by, for example, either 8 (for DES/DES3) or 16/32 bytes (for AES-128/256), therefore, if the data has incompatible length, some extra data has to be added before encryption, and stripped down before presenting the decrypted data. This process is called padding. There's no standard padding scheme yet, but one scheme is so widely. used, that it has become "de-facto" a standard. This scheme is described together with RSA keys encoding in PKCS#1 standard from RSA Securities.

The scheme works as follows, where before encryption, the input data is always padded. This means that even if data's length is divisible by 16 in a case of AES, additional 16 bytes are added. More precise, number of bytes added—N—can be calculated by the following equation: N=16−(L % 16), where L is input data's length in bytes; %—is a remainder for L over 16. N is in the range [1-16]. By adding N bytes, L+N become divisible by 16. Each added byte contains the same value, which is equal to N. The padded data is then encrypted.

Before presenting decrypted data after decryption, the padding part has to be stripped down. The algorithm may be described as: 1) get the value of the last byte −N; 2) check that at least N last bytes all have value N; 3) "delete" last N bytes and update data length by subtracting N ("deleting" can be done by just updating the length).

This padding scheme has been used for quite some time and if we need interoperability in terms that other crypto providers have to process our data, they understand PKCS#1 padding.

To support the key management system, the following support is required: 1) hash functions—SHA1 or SHA2; 2) AES-256 in ECB/CBC mode (AES-256/ECB mode is going to be combined with the TWEAK to prevent from "cut & paste" attack); 3) TWEAK implementation; 4) PBKDF2 key derivation function described in PKCS#5 v2; 5) PKCS#1 padding according to PKCS#1 standard; 6) HMAC-SHA signing/verification; and 7) Diffie-Hellman key sharing support.

There can be a need for PKI and RSA support if Key Management System has to be integrated with customer's PKI infrastructure or support certificates to distribute user's keys and policies.

The PKI key management system requires: 1) ASN.1 parser; 2) support to PKCS 1, 5, 8, 9, 10 and probably PKCS11 and PKCS12; 3) support for standard X.509 certificate extensions and attributes; 4) support to X.509 v3 certificates with possible customer specific attributes and extensions and world wide names; 5) possible support for Diffie-Hellman key exchange (PKCS#3), TripleDES in CBC mode, and PKCS#11 to work seamlessly with third-party crypto providers.

There can be a need for a common crypto interface (crypto abstraction layer—CAL) shared by all components that need any type of crypto support. This layer has to allow easy plugging in of different crypto providers, like third-party crypto libraries that can be already in use by our perspective customers, so they trust them and want to keep using them. CAL will be able to support multiple hardware crypto providers and crypto accelerators together with third-party crypto libraries. CAL will allow registering different crypto providers (either software or hardware) for different tasks (like one—for AES, another—for SHA1 and HMAC-SHA1).

Every security system has at least one very important security key, called the Root Key (RK) or Master Key that is used to protect the most important data—usually other keys or root certificates. Protecting this key itself is a challenge. There are three basic approaches to protect the MK: 1) secure physical location with all protection available; 2) storing the MK on FIPS-140.1 level 2 and up Secure Hardware Modules; and 3) Shamir's key splitting scheme.

Protecting the MK is just one side of the problem; another side is to have the MK easily available when needed. Having just one MK introduces another problem—what to do if the key is lost? Making additional copies is usual approach to facilitate this problem, which, in turn, introduces additional security risks and increase complexity of key revocation. First two approaches can, theoretically, achieve high storage security for MK, but lack both easy availability and simple revocation procedure. Shamir's key splitting scheme (SKS) was introduced to effectively address the last two problems.

The idea of SKS is to split a shared secret (S)—an arbitrary bit string, which can be a key, a password, . . . , into N parts with respect to K<N, in such a way, that having less than K parts cannot help restoring S, but having any K and more parts allow unambiguous restoring of S.

The SKS scheme has many mathematical implementation, but the simplest, proposed by Shamir himself, is a concept, called a threshold secret sharing, which is described below.

A probabilistic algorithm PA defines a threshold secret sharing. It takes as input a secret S from some finite set Fs, and it outputs n shares, i.e. bit strings S1, . . . , Sn. Finally, the secret sharing scheme comes with a threshold K, 0<K<N. The algorithm must comply with Privacy and Correctness requirements, outlined below. With respect to privacy: Take any subset I of indices {1,2, . . . n} of size at most K−1, and run the algorithm, on any input S', then the probability distribution of {Si|i∈I} is independent of S'. With respect to correctness: Take any subset J of the indices {1,2 . . . N} of size at least K, and the algorithm computes S from {Si|i∈J}, and, in fact, there is an efficient algorithm that computes S from {Si|i∈J}.

As an example, assume we set $S=Z_p$ for some prime P, where P>N, and K is threshold we want. Then we can describe the algorithm proposed by Shamir:

1) Choose elements $a_1, a_2, \ldots, a_n \in Z_p$ at random, and let f(x) be the polynomial f(x)=S+$a_1$*x+$a_2$*(x**2)+. . . +$a_k$*(x**k). In other words: choose a random polynomial over Zp of degree K at most, such as f(0)=S.

2) Let the shares be defined by $s_i$=f(i) mod P for I=1, . . , N.

The scheme has the properties outlined above, simply because of classical results on Lagrange interpolation. For agrange interpolation: For any field F, and any set of pairs {($x_i$, $y_i$)|0<i<K+1}∈F×F where $x_i$ are distinct, there exists exactly one polynomial g(x) over F of degree at most K, such that g($x_i$)=$y_i$ for i=1 . . . K+1. All coefficients of this polynomial can be effectively computed. For the proof, note that polynomial $$g_i(x) = \frac{(x_1 - x)(x_2 - x) \ldots (x_{i-1} - x)(x_{i+1} - x) \ldots (x_{k+1} - x)}{(x_1 - x_i)(x_2 - x_i) \ldots (x_{i-1} - x_i)(x_{i+1} - x_i) \ldots (x_{k+1} - x_i)}$$

satisfies g($x_i$)=1, g($x_j$)=0 for j≠I, and has degree at most K. It follows that g(x)=$y_1 g_1(x)$+. . . +$y_{k+1} g_{k+1}(x)$ has the right properties. It follows directly by construction that g can be efficiently computed. There can be only one solution, since if two different polynomials g(x), g'(x) were both solutions, then g(x)−g'(x) would be a non-zero polynomial of degree at most K with K+1 roots, which cannot exist.

The invention claimed is:

1. A method of transferring data between a computer and a mobile storage device, the method comprising:
   generating a cryptographic key;
   generating a security domain secret, the security domain secret being a secret associated with a security domain, the security domain defining a set of objects that are protected by the cryptographic key and a set of computers for accessing the protected objects;
   provisioning a mobile storage device as one of the set of objects within the security domain by:
      encrypting the cryptographic key using a password and the security domain secret, and
      storing the encrypted cryptographic key on the mobile storage device;
   provisioning a computer by storing the security domain secret in a memory device on the computer;
   coupling the mobile storage device to an interface of the computer; and
   performing a data transfer by:
      decrypting the cryptographic key with the password and the security domain secret;
      performing a cryptographic operation on data using the decrypted cryptographic key; and
      transferring the data between the mobile storage device and the computer.

2. The method of claim 1, wherein the computer stores a policy, the policy defining a set of allowable operations to be performed by the computer with respect to the mobile storage device.

3. The method of claim 2, wherein the set of operations is selected from the group consisting of read operations and write operations.

4. The method of claim 1, wherein the mobile storage device stores an identifier corresponding to the security domain associated with the mobile storage device, the method further comprising:
   determining whether the security domain associated with the mobile storage device encompasses the security domain associated with the security domain secret stored on the computer;
   allowing the data transfer if the security domain associated with the mobile storage device encompasses a security domain associated with the security domain secret stored on the computer; and
   denying the data transfer if the security domain associated with the mobile storage device excludes the security domain associated with the security domain secret stored on the computer.

5. A system for transferring data, the system comprising:
   a mobile storage device, the mobile storage device having stored thereon an encrypted cryptographic key, the encrypted cryptographic key being encrypted with a password and a security domain secret, the security domain secret is a secret associated with a security domain, the security domain defining a set of objects that are protected by the cryptographic key and a set of computers for accessing the protected objects;
   a computer having a memory for storing the security domain secret and an interface for coupling to external devices, the computer being configured to:
   couple to the mobile storage device at the interface;
   transfer data to and from the mobile storage through the interface device by:
      decrypting the cryptographic key with the password and the security domain secret;
      performing a cryptographic operation on the data using the cryptographic key; and
      transferring the data between the mobile storage device and the computer.

6. The system of claim 5, wherein the computer memory stores a policy, the policy defines a set of allowable operations to be performed by the computer with respect to the mobile storage device.

7. The system of claim 6, wherein the set of operations is selected from the group consisting of read operations and write operations.

8. The system of claim 5, wherein the mobile storage device stores an identifier corresponding to the security domain associated with the mobile storage device; and wherein the computer is further configured to:
   determine whether the security domain associated with the mobile storage device encompasses a security domain associated with the security domain secret stored on the computer;
   allow the data transfer if the security domain associated with the mobile storage device encompasses the security domain associated with the security domain secret stored on the computer; and
   deny the data transfer if the security domain associated with the mobile storage device excludes the security domain associated with the security domain secret stored on the computer.

* * * * *